US009298072B2

(12) United States Patent
Kinebuchi et al.

(10) Patent No.: US 9,298,072 B2
(45) Date of Patent: Mar. 29, 2016

(54) PROJECTOR HAVING INCLINATION DETECTION SECTION FOR DETECTING INCLINATION OF PROJECTOR ENCLOSURE AND METHOD FOR CONTROLLING THE SAME

(71) Applicant: Seiko Epson Corporation, Tokyo (JP)

(72) Inventors: Tadashi Kinebuchi, Okaya (JP); Koichi Miyasaka, Matsumoto (JP); Hiroaki Shinha, Matsukawa-mura (JP)

(73) Assignee: Seiko Epson Corporation, Tokyo (JP)

( * ) Notice: Subject to any disclaimer, the term of this patent is extended or adjusted under 35 U.S.C. 154(b) by 200 days.

(21) Appl. No.: 14/100,621

(22) Filed: Dec. 9, 2013

(65) Prior Publication Data
US 2014/0168618 A1   Jun. 19, 2014

(30) Foreign Application Priority Data

Dec. 19, 2012   (JP) .................................. 2012-276557
Sep. 11, 2013   (JP) .................................. 2013-188035

(51) Int. Cl.
*G03B 21/14* (2006.01)
*H04N 9/31* (2006.01)
(Continued)

(52) U.S. Cl.
CPC ................ *G03B 21/142* (2013.01); *G03B 3/00* (2013.01); *G03B 21/147* (2013.01); *H04N 5/23212* (2013.01); *H04N 5/23296* (2013.01);
(Continued)

(58) Field of Classification Search
CPC ...... G03B 21/14; G03B 21/00; G03B 21/142; G03B 21/147; G03B 3/00; H04N 9/3185; H04N 9/3194; H04N 9/3197; H04N 5/23296; H04N 5/23212
See application file for complete search history.

(56) References Cited

U.S. PATENT DOCUMENTS 5,471,295 A * 11/1995 Hirotsune ............ H04N 9/3185
356/138
2003/0095239 A1   5/2003 Hirao et al.
(Continued)

FOREIGN PATENT DOCUMENTS

| EP | 0607596 A2 | 7/1994 | |
| JP | 2005-94599 A | 4/2005 | |
| JP | 2005-99588 A | 4/2005 | |
| JP | 2006-227143 A | 8/2006 | |
| JP | 2006227143 A * | 8/2006 | ............ G03B 21/14 |
| JP | 2009175174 A | 8/2009 | |
| JP | 2012-19442 A | 1/2012 | |

OTHER PUBLICATIONS

European Search Report, Jul. 24, 2015, issued in related Patent Application No. EP-13197074.

*Primary Examiner* — Sultan Chowdhury
*Assistant Examiner* — Magda Cruz
(74) *Attorney, Agent, or Firm* — ALG Intellectual Property, LLC

(57) ABSTRACT

A projector includes a light source, a light modulator having an image formation area to form an image, a projection system that projects the image on a display surface, an enclosure that holds at least the light modulator and the projection system, an inclination detection section that detects the inclination of the enclosure with respect to an axis along the optical axis of the projection system, and an image display control section that forms a reference line on the image formation area, the reference line having a predetermined angle with respect to a horizontal line irrespective of the inclination of the enclosure, and the image display control section changes the inclination of the reference line with respect to the image formation area in accordance with the inclination of the enclosure in such a way that the reference line has the predetermined angle with respect to the horizontal line.

15 Claims, 9 Drawing Sheets

(51) Int. Cl.
*G03B 3/00* (2006.01)
*H04N 5/232* (2006.01)

(52) U.S. Cl.
CPC ........... *H04N9/3185* (2013.01); *H04N 9/3194* (2013.01); *H04N 9/3197* (2013.01)

(56) References Cited

U.S. PATENT DOCUMENTS

2005/0024598 A1   2/2005   Inoue
2011/0188004 A1*  8/2011   Maeda ................... G03B 21/16
                                                  353/43

* cited by examiner

PROJECTOR HAVING INCLINATION DETECTION SECTION FOR DETECTING INCLINATION OF PROJECTOR ENCLOSURE AND METHOD FOR CONTROLLING THE SAME

The entire disclosure of Japanese Patent Application Nos. 2012-276557, filed Dec. 19, 2012, and 2013-188035, filed Sep. 11, 2013 are expressly incorporated by reference herein.

BACKGROUND

1. Technical Field

The present invention relates to a projector and a method for controlling the same.

2. Related Art

In recent years, there is a proposed projector having a connection section (base) connectable to a light bulb fixture, such as a light bulb attachment socket and a light bulb attachment receptacle (see JP-A-2005-99588, for example).

FIG. 9 is a descriptive view of the projector described in JP-A-2005-99588. A projector 800 shown in FIG. 9 is one of Examples in JP-A-2005-99588.

The projector 800 (hereinafter referred to as projector 800 of related art) has an exterior shape of a light bulb in itself and includes a projector enclosure 810 and a connection section 820 provided at the rear end 811 of the projector enclosure 810 (the end facing away from the end 812 on an image projection port side through which an image is projected). The connection section 820 forms the same base as that of a typical incandescent light bulb and is connectable to a light bulb fixture (which is assumed to be light bulb attachment socket) 910 of an illuminator fixture 900 or any other fixture. A projector connectable to a light bulb socket is therefore called a "light-bulb-type projector" in some cases in the specification.

The projector 800 of related art described above is used with the connection section 820 screwed into the light bulb attachment socket 910. The projector 800 is therefore problematic in that a user has a difficulty knowing the projection attitude of the projector 800 with respect to a display surface (not shown in FIG. 9).

In general, the projector 800 of the type described above projects an image, for example, on a wall surface in many cases instead of projecting an image on a screen in a conference room, a classroom, or any other similar place. It is therefore not easy to adjust the projecting attitude of the projector 800 in such a way that an image projected by the projector is displayed on a display surface in a state in which a viewer does not feel something is wrong with the image but the viewer comfortably looks at the image.

In particular, when the light bulb attachment socket 910 is disposed in a position in the vicinity of an inner vertex of an umbrella-shaped portion 920 having a relatively narrow opening and a long depth, for example, as shown in FIG. 9, part of the projector 800 attached to the light bulb attachment socket 910 or a large part thereof is covered with the umbrella-shaped portion 920, making the adjustment of the projecting attitude of the projector more difficult.

SUMMARY

An advantage of some aspects of the invention is to provide a projector that allows easy, reliable adjustment of the projecting attitude of the projector in such a way that an image projected by the projector is displayed on a display surface in a state in which a viewer does not feel something is wrong with the image but the viewer comfortably looks at the image. Another advantage of some aspects of the invention is to provide a method for controlling the projector.

[1] A projector according to an aspect of the invention includes a light source, a light modulator having an image formation area that modulates light emitted from the light source to form an image, a projection system that projects the image formed by the light modulator to display the image on a display surface, an enclosure that holds at least the light modulator and the projection system, an inclination detection section that detects the inclination of the enclosure with respect to an axis along the optical axis of the projection system that serves as the axis of rotation, and an image display control section that forms a reference line on the image formation area, the reference line having a predetermined angle with respect to a horizontal line irrespective of the inclination of the enclosure, and the image display control section changes the inclination of the reference line with respect to the image formation area in accordance with the inclination of the enclosure detected by the inclination detection section in such a way that the reference line has the predetermined angle with respect to the horizontal line.

According to the projector of the aspect of the invention, the image display control section forms a reference line having a predetermined angle with respect to a horizontal line on the image formation area irrespective of the inclination of the enclosure. The projection attitude of the projector can be adjusted with respect to the displayed reference line having the predetermined angle with respect to the horizontal line irrespective of the inclination of the enclosure, whereby the convenience of a user who adjusts the projection attitude of the projector is improved.

[2] In the projector according to the aspect of the invention, it is preferable that the image display control section has a function of drawing a first reference line on the image formation area to display the first reference line inclined in accordance with the inclination of the enclosure on the display surface and a function of drawing a second reference line as the reference line on the image formation area to display the second reference line uninclined irrespective of the inclination of the enclosure on the display surface.

According to the projector of this configuration, since the image display control section has a function of drawing a first reference line on the image formation area to display the first reference line inclined in accordance with the inclination of the enclosure on the display surface and a function of drawing a second reference line on the image formation area to display the second reference line uninclined irrespective of the inclination of the enclosure on the display surface, the user can adjust the projection attitude of the projector based on the first and second reference lines displayed on the display surface. Therefore, according to the projector of the configuration described above, the projection attitude of the projector can be readily and reliably adjusted, whereby the projector can display an image on the display surface that is comfortably viewed by a viewer without causing the viewer to feel something is wrong with the image.

[3] In the projector according to the aspect of the invention, it is preferable that the image display control section draws a line extending along the outer shape of the image formation area as the first reference line.

Displaying the first reference line on the display surface in the form of a line extending along the outer shape of the image formation area as described above allows the user who is performing the projection attitude adjustment to know the degree of the projection attitude adjustment and other information based, for example, on the degree of distortion of the line extending along the outer shape of the image formation area, whereby the projection attitude adjustment can be readily performed.

[4] In the projector according to the aspect of the invention, it is preferable that the image display control section draws lines corresponding to at least two opposing sides of the four sides of the outer shape of the image formation area as the first reference line.

When the first reference line is formed of two lines corresponding to at least two opposing sides of the four sides of the outer shape of the image formation area as described above, the first reference line is displayed in the form of an image formed of the two lines set apart from each other by a predetermined distance on the display surface. Displaying the first reference line as described above allows the user who is performing the projection attitude adjustment to know the degree of the projection attitude adjustment and other information based, for example, on the degree of distortion of the image formed of the two lines, whereby the projection attitude adjustment can be readily performed.

[5] In the projector according to the aspect of the invention, it is preferable that the image display control section draws four lines corresponding to the four sides of the outer shape of the image formation area as the first reference line.

When the first reference line is formed of four lines corresponding to the four sides of the outer shape of the image formation area as described above, the first reference line is displayed on the display surface in the form of a quadrangular frame-shaped image. Displaying the first reference line as described above allows the user who is performing the projection attitude adjustment to intuitively know the degree of the projection attitude adjustment and other information based, for example, on the degree of distortion of the quadrangular frame-shaped image, whereby the projection attitude adjustment can be readily performed.

[6] In the projector according to the aspect of the invention, it is preferable that the image display control section draws a straight line inclined in a direction opposite to the inclination of the enclosure by the same angle as the inclination of the enclosure as the second reference line based on the inclination of the enclosure detected by the inclination detection section in such a way that the second reference line displayed on the display surface is a horizontal line.

Drawing the second reference line as described above allows the second reference line to be displayed on the display surface always in the form of a horizontal line even when the enclosure is rotated around the central axis of the projector.

[7] In the projector according to the aspect of the invention, it is preferable that the image display control section draws a straight line inclined in a direction opposite to the inclination of the enclosure by the same angle as the inclination of the enclosure as the second reference line based on the inclination of the enclosure detected by the inclination detection section in such a way that the second reference line displayed on the display surface is a vertical line.

Drawing the second reference line as described above allows the second reference line to be displayed on the display surface always in the form of a vertical line even when the enclosure is rotated around the central axis of the projector.

[8] In the projector according to the aspect of the invention, it is preferable that the image display control section draws the second reference line in such a way that the second reference line passes through the center of the image formation area.

[9] In the projector according to the aspect of the invention, it is preferable that the projector further includes a communication section that receives a remote operation signal issued from a remote operation apparatus and a storage section that stores identification information specific to the projector, and the image display control section draws the first reference line when the identification information is inputted from the remote operation apparatus.

According to the configuration described above, when a plurality of projectors are so disposed that images projected by the plurality of projectors are displayed side by side on the display surface and the plurality of projectors are remotely operated with a single remote operation apparatus, a projector the projection attitude of which is currently about to be adjusted can readily be related to an image projected by the projector. Therefore, even when images projected by the plurality of projectors are displayed side by side on the display surface, the projection attitude of each of the projectors can be readily and reliably adjusted with the single remote operation apparatus.

[10] In the projector according to the aspect of the invention, it is preferable that the image display control section causes the first reference line to blink.

Causing the first reference line to blink on the display surface as described above allows a projector the projection attitude of which is currently about to be adjusted to be intuitively related to an image projected by the projector. Therefore, even when images projected by the plurality of projectors are displayed side by side on the display surface, the projection attitude of each of the projectors can be readily and reliably adjusted with the single remote operation apparatus.

[11] In the projector according to the aspect of the invention, it is preferable that the image display control section forms two lines substantially parallel to each other as the reference line on the image formation area and differentiates a display state inside the two reference lines and a display state outside thereof from each other.

According to the configuration described above, the projection attitude of the projector may be adjusted in such a way that the amount of portions outside the two reference lines decreases, whereby the adjustment can be readily (efficiently) performed.

[12] In the projector according to the aspect of the invention, it is preferable that the image display control section forms, as the two reference lines, a reference line passing through a first point in the image formation area and a reference line passing through a second point so disposed that the first and second points are symmetrical with respect to the center of the image formation area.

In the configuration described above, a reference line passing through a first point in the image formation area and a reference line passing through a second point so disposed that the first and second points are symmetrical with respect to the center of the image formation area are formed as the two reference lines. As a result, when the projector is adjusted into a position where an optimum projection attitude thereof is achieved, the amount of portions outside the reference lines is minimized, whereby the convenience of the user who performs the adjustment is improved.

[13] In the projector according to the aspect of the invention, it is preferable that the image display control section forms, as the two reference lines, a reference line passing through a first corner of the image formation area and a reference line passing through a second corner diagonally opposite to the first corner.

In the configuration described above, a reference line passing through a first corner of the image formation area and a reference line passing through a second corner diagonally opposite to the first corner are formed as the two reference lines. As a result, when the projector is adjusted into a position where an optimum projection attitude thereof is achieved, the amount of portions outside the reference lines decreases to zero, whereby the convenience of the user who performs the adjustment is improved.

[14] In the projector according to the aspect of the invention, it is preferable that the light modulator is so disposed that the optical axis of the projection system passes through the center of the image formation area.

The configuration described above allows the inclination of the enclosure to coincide with the inclination of the light modulator.

[15] In the projector according to the aspect of the invention, it is preferable that the projector further includes a connection section to be connected to a screw-in light bulb fixture, and the axis of rotation along which the connection section is screwed into the light bulb fixture preferably coincides with the optical axis of the projection system.

The configuration described above allows the inclination of the enclosure at the time when the projector is screwed into the light bulb fixture (angle of rotation around optical axis that serves as the axis of rotation) to coincide with the inclination of the projection system (angle of rotation around optical axis that serves as the axis of rotation).

[16] A method for controlling a projector according to another aspect of the invention is a method for controlling a projector including a light source, a light modulator having an image formation area that modulates light emitted from the light source to form an image, a projection system that projects the image formed by the light modulator to display the image on a display surface, and an enclosure that holds at least the light modulator and the projection system. The method includes detecting the inclination of the enclosure with respect to an axis along the optical axis of the projection system that serves as the axis of rotation and forming a reference line on the image formation area, the reference line having a predetermined angle with respect to a horizontal line irrespective of the inclination of the enclosure, and in the forming of a reference line, the inclination of the reference line with respect to the image formation area is changed in accordance with the inclination of the enclosure detected in the detecting of the inclination in such a way that the reference line has the predetermined angle with respect to the horizontal line.

The method for controlling a projector according to the aspect of the invention can provide the same advantageous effects as those provided by the projector according to the aspect of the invention described in the above item [1]. The method for controlling a projector according to the aspect of the invention also preferably has the same features as those of the projectors according to the aspect of the invention described in the above items [2] to [15].

BRIEF DESCRIPTION OF THE DRAWINGS

Embodiments of the invention will now be described by way of example only with reference to the accompanying drawings, wherein like numbers reference like elements.

DESCRIPTION OF EXEMPLARY EMBODIMENTS

Figure 1A:
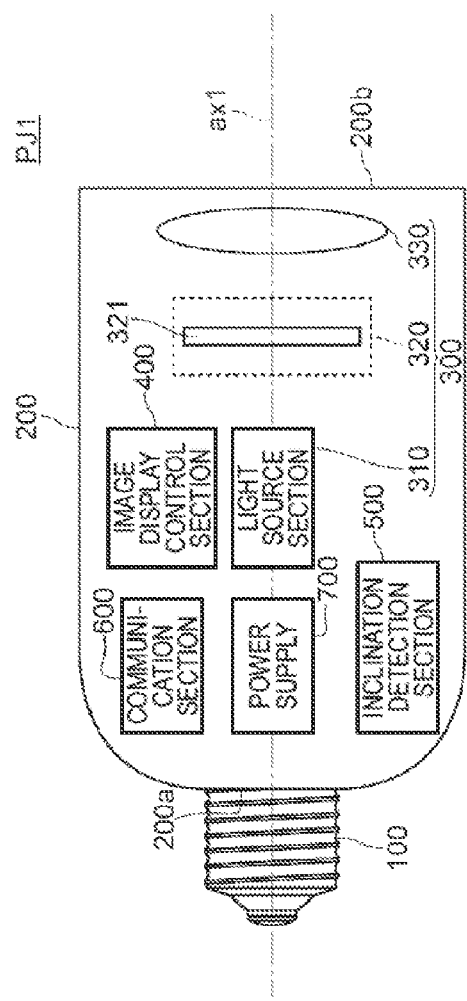
FIGS. 1A and 1B are descriptive views of a projector according to a first embodiment.
Figure 1B:
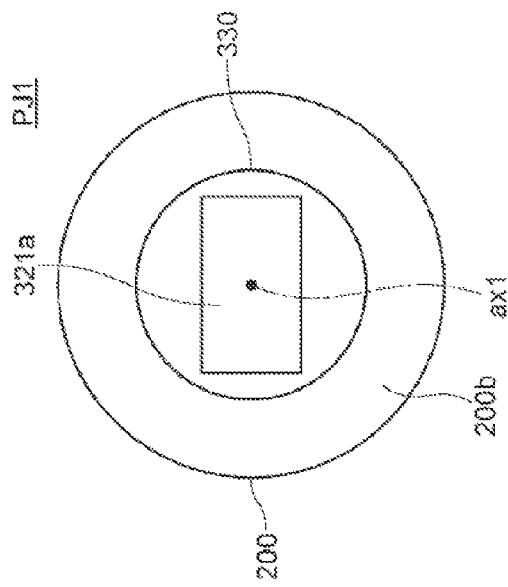

Embodiments of the invention will be described below.
First Embodiment
FIGS. 1A and 1B are descriptive views of a projector according to a first embodiment. FIG. 1A diagrammatically shows the internal configuration of a projector PJ1, and FIG. 1B diagrammatically shows the relationship between a projection lens 330 and an image formation area 321a of a light modulator 321 in the projector PJ1 viewed from the image projection port side.

The projector PJ1 according to the first embodiment includes a connection section 100 electrically connectable to a light bulb fixture, such as a light bulb attachment socket or a light bulb attachment receptacle, and an enclosure 200 (hereinafter referred to as projector enclosure 200). The projector enclosure 200 has a rear end 200a, to which the connection section 100 is attached, and a front end 200b, which faces away from the rear end 200a and has an image projection port.

It is assumed that the connection section 100 is a base (base defined as "E26", for example) provided on a typical light bulb (such as incandescent light bulb, light-bulb-type fluorescent lamp, and LED bulb). The projector PJ1 can therefore be connected to a light bulb fixture, such as a light bulb attachment socket or a light bulb attachment receptacle, with the connection section 100 screwed into the light bulb fixture, as any of the typical light bulbs described above. The light bulb fixture to which the connection section 100 is connected supplies the connection section 100 with electric power.

To connect the projector PJ1 to the light bulb fixture, the connection section 100 is lightly inserted into the light bulb fixture and the projector enclosure 200 is rotated clockwise. The projector PJ1 can thus be connected to the light bulb fixture. On the other hand, to disconnect the projector PJ1 from the light bulb fixture, the projector enclosure 200 is rotated counterclockwise. The projector PJ1 can thus be disconnected from the light bulb fixture. In the following description, the axis of rotation around which the projector enclosure 200 is rotated when the projector PJ1 is connected to the light bulb fixture or disconnected therefrom is called a central axis ax1 of the projector PJ1. That is, the central axis ax1 is an axis extending from the connection section 100 and passing through the front end 200b. Further, the following description will be made assuming that the "light bulb fixture" is a "light bulb attachment socket."

In the projector PJ1 according to the first embodiment, the projector enclosure 200 has a substantially cylindrical shape and accommodates an image projection unit 300, an image display control section 400, an inclination detection section 500, a communication section 600, and a power supply 700.

The projector enclosure 200 does not necessarily have a cylindrical shape but can have a spherical shape, a trumpet-like shape, and a variety of other shapes as long as they do not compromise the function as a projector.

The components described above (such as image projection unit 300, image display control section 400, inclination detection section 500, communication section 600, and power supply 700) provided in the projector enclosure 200 are fixed to (held by) the projector enclosure 200. Therefore, when the projector PJ1 is connected to or disconnected from the light bulb attachment socket, the components described above as well as the projector enclosure 200 are rotated around the central axis ax1.

The image projection unit 300 includes a light source section 310, an image formation section 320, and a projection lens 330 as a projection system that enlarges and projects an image formed by the image formation section 320. The components that form the image projection unit 300 are also fixed to (held by) the projector enclosure 200. In FIGS. 1A and 1B, the configuration of the image projection unit 300 is simplified and diagrammatically illustrated.

The light source section 310 is formed of a light emitting diode or any other light source and sequentially outputs red light, green light, and blue light in a time division manner in the first embodiment.

The image formation section 320 includes a light modulator 321 having a rectangular image formation area 321a formed of a plurality of pixels. It is assumed in the following description that a transmissive liquid crystal light modulator is used as the light modulator 321. The light modulator 321, specifically, in the image formation area 321a sequentially modulates the color light fluxes outputted in a time division manner from the light source section 310 in accordance with image information to be projected to form images associated with the color light fluxes. The image formation section 320 further includes a light-incident-side polarizer (not shown) on the light incident side of the light modulator 321 and a light-exiting-side polarizer (not shown) on the light exiting side of the light modulator 321. In the following description, the light modulator 321 is also referred to as a liquid crystal panel 321.

Figure 2:
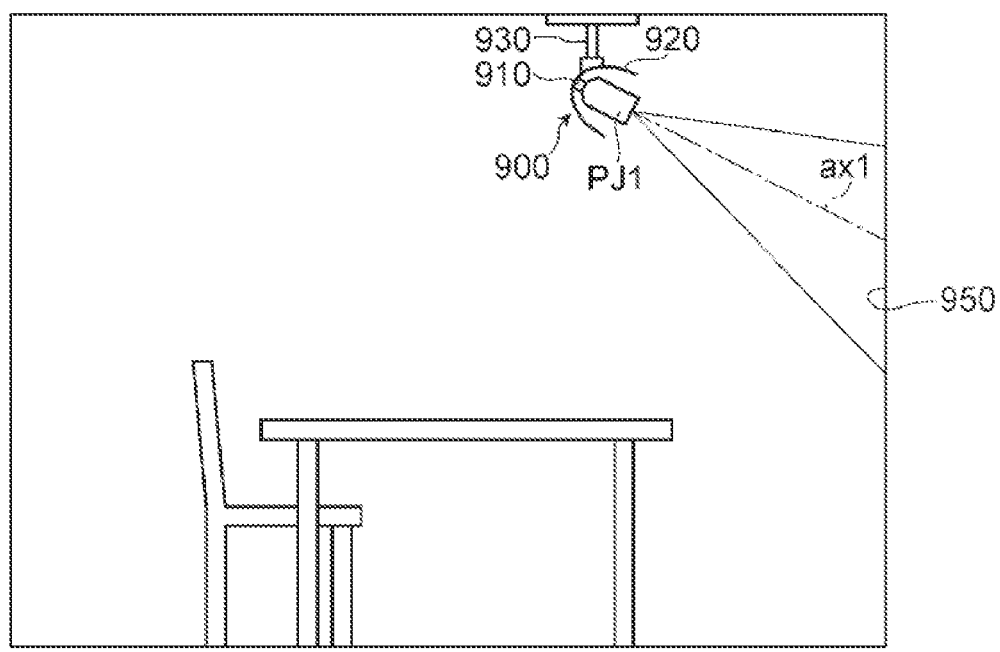
FIG. 2 is a descriptive view of an example in which the projector according to the first embodiment is installed.

The projection lens 330 enlarges and projects the images formed by the liquid crystal panel 321 on a display surface (which is assumed to be, for example, a wall surface 950 that extends in the vertical direction, as shown in FIG. 2). As a result, the images formed with the red light, the green light, and the blue light are sequentially projected on the display surface in a time division manner and visually recognized as a full-color image.

The thus configured image projection unit 300 is so disposed in the projector enclosure 200 that the center (optical axis) of the image formation area 321a of the liquid crystal panel 321 coincides with the center (optical axis) of the projection lens 330 and the optical axes coincide with the central axis ax1 of the projector PJ1 as shown in FIGS. 1A and 1B. The orientation of the projector PJ1 in the state in which the connection section 100 of the projector PJ1 is attached to the light bulb attachment socket therefore coincides with the optical axes of the images projected from the projector PJ1.

The image display control section 400 includes a CPU or any other processor (not shown) and a RAM, a ROM, and other storage devices (not show) and has functions of controlling image display (projection) operation in a variety of manners. Specific examples of the functions described above in the image display control section 400 will be described later.

The inclination detection section 500 detects inclination (angle of rotation) of the projector enclosure 200 (liquid crystal panel 321) around the central axis ax1. That is, the inclination detection section 500 detects the amount of inclination of the projector enclosure 200 (liquid crystal panel 321) around the central axis ax1 with respect to a horizontal line in terms of degree and outputs the detected angle of rotation to the image display control section 400. Specifically, when the projector PJ1 projects and displays an image on the wall surface 950 shown in FIG. 2 or any other surface, the inclination detection section 500 detects the inclination of the image displayed on the wall surface 950 with respect to a horizontal line in the form of the angle of rotation around the central axis ax1 of the projector PJ1 and outputs the detected angle of rotation. In the following description, "around the central axis ax1" is abbreviated to "around the central axis" without the reference character "ax1."

The communication section 600 can send and receive signals to and from a remote operation apparatus (referred to as remote control). The power supply 700 converts electric power supplied via the connection section 100 as appropriate and supplies the image projection unit 300, the image display control section 400, the inclination detection section 500, the communication section 600, and other components with the converted electric power.

The projector PJ1 according to the first embodiment with the connection section 100 of the projector PJ1 connected to the light bulb attachment socket (with the connection section 100 screwed into the light bulb attachment socket to the end thereof) has a structure that allows the projector enclosure 200 to rotate around the central axis clockwise or counterclockwise over a predetermined angular range of rotation without any rotation of the connection section 100.

The structure described above is not part of the substance of the invention and no specific configuration will therefore be described or illustrated. The structure does not cause the connection section 100 screwed into the light bulb attachment socket to the end thereof to rotate but allows only the projector enclosure 200 to rotate freely with respect to the connection section 100 counterclockwise over a predetermined range (360 degrees, for example). With the connection section 100 rotated counterclockwise by the predetermined range, the structure does not cause the connection section 100 to rotate but allows only the projector enclosure 200 to rotate freely with respect to the connection section 100 clockwise over a predetermined range (360 degrees, for example). Having been rotated freely and reached a desired angle of rotation, the projector enclosure 200 is not allowed to be rotated and remains in the position.

Since the image projection unit 300, the image display control section 400, the inclination detection section 500, the communication section 600, the power supply 700, and other components provided in the projector enclosure 200 are fixed thereto as described above, the components described above are rotated as the projector enclosure 200 is rotated.

The projector PJ1, the structure of which allows the projector enclosure 200 to rotate freely with respect to the connection section 100 over a predetermined angular range as described above, can be still connected to and disconnected from the light bulb attachment socket.

That is, to connect the projector PJ1 to the light bulb attachment socket, the connection section 100 is lightly inserted into the light bulb attachment socket, and the projector enclosure 200 is rotated clockwise. The projector enclosure 200 is first rotated freely with respect to the connection section 100, but the force by which the projector enclosure 200 is rotated is eventually transmitted to the connection section 100, which is then also rotated clockwise. The connection section 100 can therefore be screwed into the light bulb attachment socket.

On the other hand, to disconnect the projector PJ1 from the light bulb attachment socket, the projector enclosure 200 with the connection section 100 screwed into the light bulb attachment socket to the end thereof is rotated counterclockwise. The projector enclosure 200 is first rotated freely with respect to the connection section 100, but the force by which the projector enclosure 200 is rotated is eventually transmitted to the connection section 100, which is then also rotated counterclockwise. The connection section 100 can therefore be disconnected from the light bulb attachment socket.

FIG. 2 is a descriptive view of an example in which the projector according to the first embodiment is installed. The projector PJ1 according to the first embodiment is, for example, attached to an illuminator fixture 900 hung from the ceiling of a room, as shown in FIG. 2. That is, the projector PJ1 is so installed that the connection section 100 (not shown in FIG. 2) is connected to a light bulb attachment socket 910 provided in an umbrella-shaped portion 920 of the illuminator fixture 900 and an image is projected on the wall surface 950 extending in the vertical direction and serving as the display surface (hereinafter referred to as display surface 950).

It is assumed that the projector PJ1 installed as shown in FIG. 2 is rotatable around the central axis as described above and swingable (rotatable) rightward and leftward with respect to the display surface 950 (in the direction approaching the reader from the plane of view of FIG. 2 and the direction away therefrom). For example, the projector PJ1 is rotated along with the umbrella-shaped portion 920 around an axis 930, which extends downward from the ceiling in the vertical direction and serves as the axis of rotation.

The illuminator fixture 900 shown in FIG. 2 is presented by way of example and does not necessarily have the shape shown in FIG. 2. The illuminator fixture 900 does not necessarily have a specific shape and can be any illuminator fixture to which a typical light bulb can be attached. Further, in FIG. 2, the illuminator fixture 900 is so attached to the ceiling that it is hung therefrom by way of example, but the illuminator fixture 900 is not necessarily attached to the ceiling. The illuminator fixture 900 may instead be attached to a wall surface or may be of a desktop type that is installed, for example, on the top plate of a table.

Figure 3:
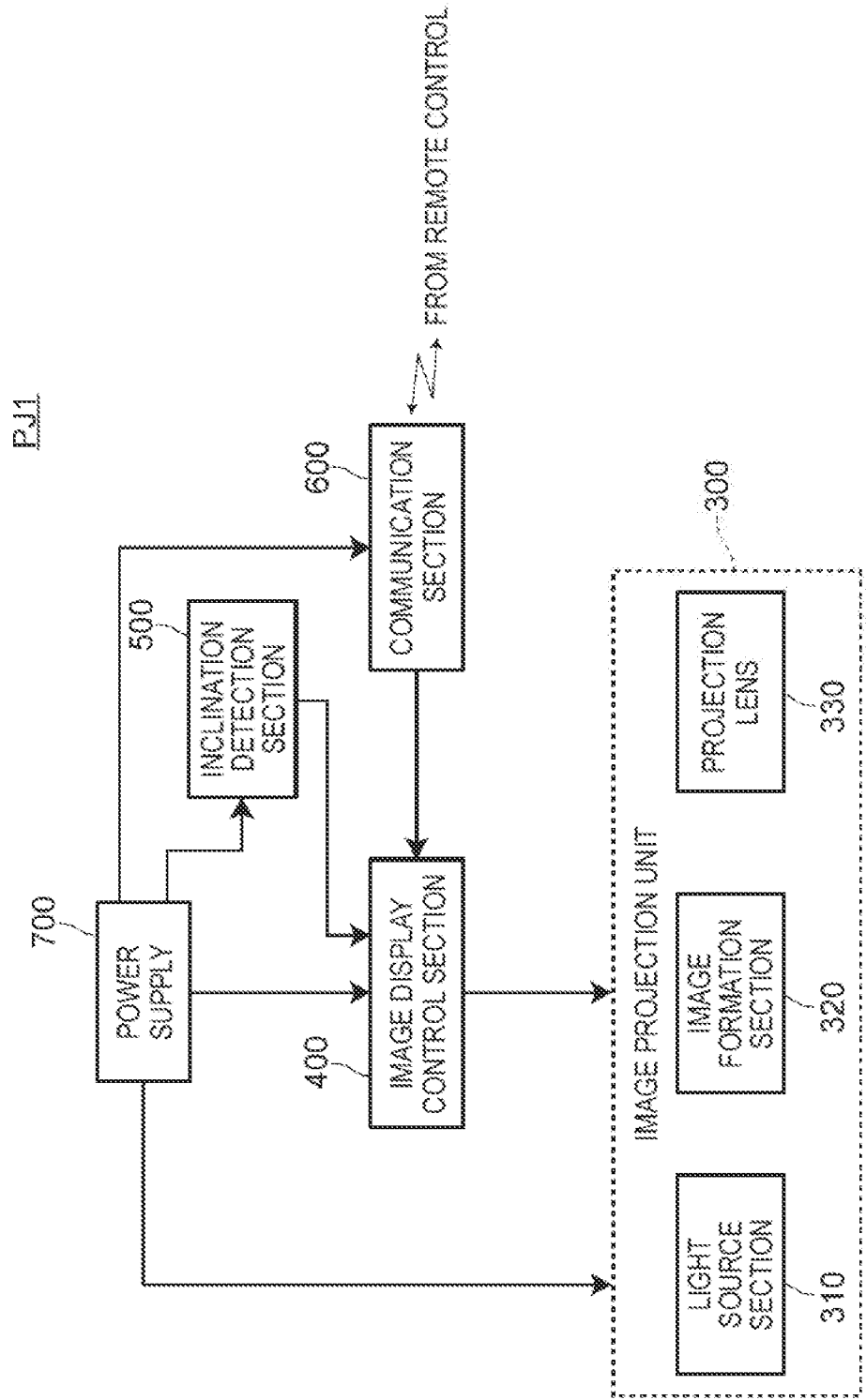
FIG. 3 shows electrical connection among components in the projector according to the first embodiment.

FIG. 3 shows electrical connection among the components in the projector according to the first embodiment. The projector PJ1 according to the first embodiment includes the image projection unit 300, the image display control section 400, the inclination detection section 500, the communication section 600, and the power supply 700, as described with reference to FIG. 1A.

The image display control section 400 has a function of turning on and off the light source (not shown) provided in the light source section 310, a function of displaying a content image by using the image projection unit 300, a function of displaying an image based on which the projecting attitude of the projector PJ1 is adjusted (referred to as projection attitude adjustment image), and a basic correction function (such as keystone correction function) that a typical projector has.

The image display control section 400 can perform each of the functions described above based on a control signal issued by the remote control and inputted through the communication section 600.

The function of displaying the projection attitude adjustment image by using the image projection unit 300 is formed of a function of drawing a reference line extending along the outer shape of the image formation area 321*a* of the liquid crystal panel 321 (first reference line) on the image formation area 321*a* to display the first reference line as a first projection attitude adjustment image on the display surface 950 and a function of drawing a reference line (second reference line) passing through the center of the image formation area 321*a* (central axis ax1) and inclined in accordance with the inclination of the projector enclosure 200 (angle of rotation around central axis) detected by the inclination detection section 500 on the image formation area 321*a* to display the second reference line as a second projection attitude adjustment image on the display surface 950.

It is assumed in the projector PJ1 according to the first embodiment that the first reference line is a "line corresponding to the four sides of the outer shape of the image formation area." When the "line corresponding to the four sides of the outer shape of the image formation area" is displayed as the first projection attitude adjustment image on the display surface 950, the first projection attitude adjustment image forms a quadrangular frame-shaped image on the display surface 950. The first projection attitude adjustment image is therefore hereinafter also referred to as a "frame image."

The second reference line in the projector PJ1 according to the first embodiment is a straight line passing through the center of the image formation area 321*a* (central axis ax1) and produced by inclining a line parallel to the upper and lower sides of the image formation area 321*a*, which should be horizontally displayed, on the image formation area 321*a* by the angle of rotation acquired at the time of drawing the second reference line in the direction opposite to the direction in which the projector enclosure 200 is inclined (rotated) around the central axis.

Since the inclination of the second reference line with respect to the image formation area 321*a* is changed in accordance with the inclination of the projector enclosure 200 detected by the inclination detection section 500 as described above, the second reference line displayed as the second projection attitude adjustment image on the display surface 950 always forms a horizontal line on the display surface 950. On the other hand, the first reference line, which is a line extending along the outer shape of the image formation area 321*a* of the liquid crystal panel 321, is so displayed on the display surface 950 that when the projector PJ1 (liquid crystal panel 321) is inclined around the central axis, the first reference line is inclined in accordance with the inclination of the projector PJ1. Since the second projection attitude adjustment image is an image with respect to which the projection attitude adjustment is made, the second projection attitude adjustment image is also hereinafter referred to as a "reference image."

A user adjusts the projection attitude of the projector PJ1 based on the first projection attitude adjustment image (frame image) and the second projection attitude adjustment image (reference image) displayed on the display surface 950. The projection attitude adjustment will be described later.

Figure 4:
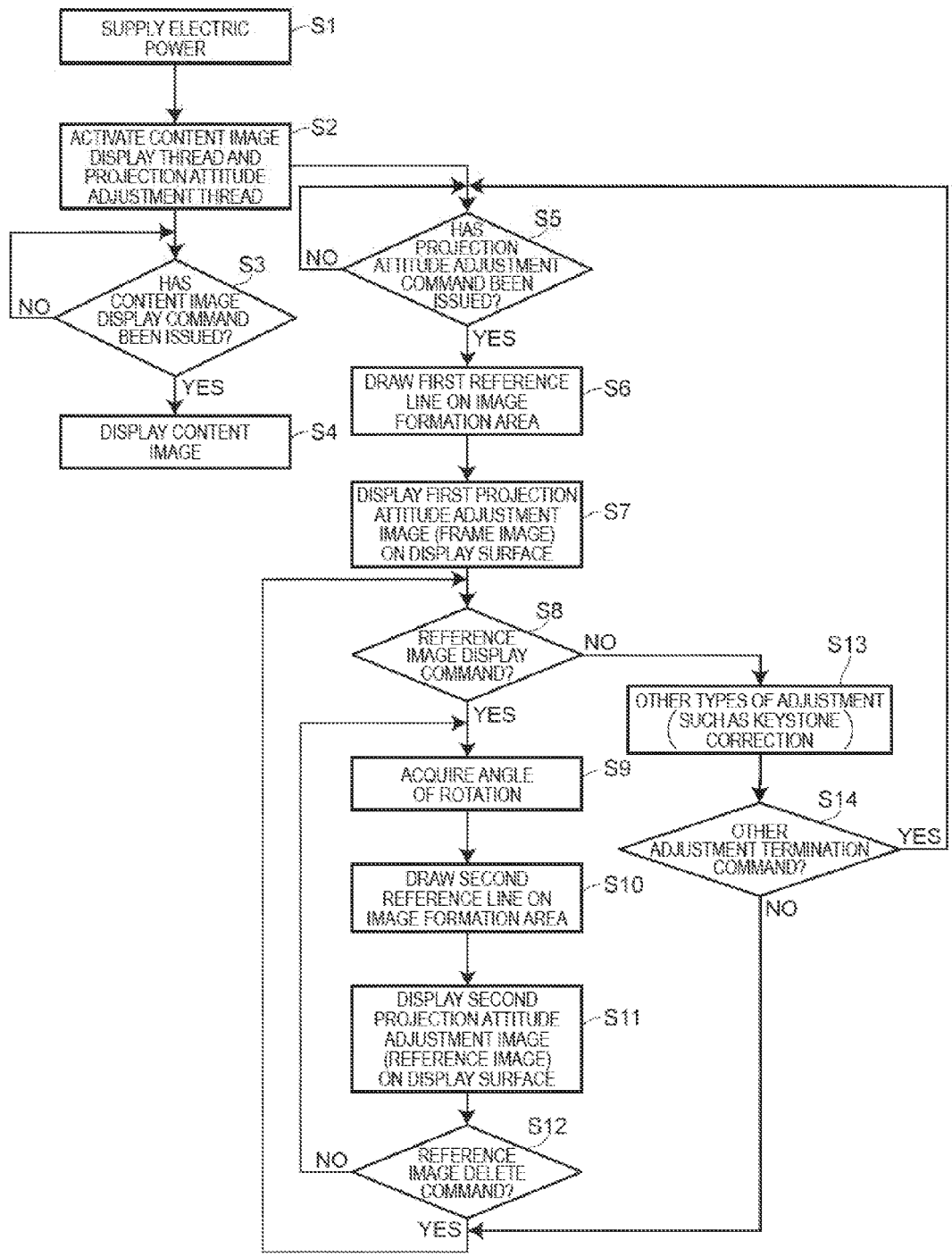
FIG. 4 is a flowchart for describing overall control of the projector according to the first embodiment.

FIG. 4 is a flowchart for describing overall control of the projector according to the first embodiment. FIG. 4 describes the procedure of processes carried out primarily by the image display control section 400. First, when electric power is supplied (step S1), the projector enters a state in which it waits for a control signal from the remote control (referred to as control wait state). When the remote control issues a control signal that causes the projector to start operating, the projector activates a thread that allows display of a content image to be displayed (referred to as content image display thread) and a thread that allows the projection attitude adjustment to be performed (referred to as projection attitude adjustment thread) (step S2). It is noted that the remote control may be an attachment to the projector PJ1 or may be a smartphone or any other mobile terminal device having a control function.

Each of the content image display thread and the projection attitude adjustment thread carries out a process corresponding thereto in response to a control signal (commands) from the remote control. That is, in the content image display thread, a content image display command for displaying a content image is monitored (step S3). When the content image display command is issued ("YES" in step S3), a content image is displayed (step S4).

On the other hand, in the projection attitude adjustment thread, a projection attitude adjustment command for adjusting the projection attitude is monitored (step S5). When the projection attitude adjustment command is issued ("YES" in step S5), processes in step S6 and the following steps are carried out. The processes in step S6 and the following steps will be described below.

When the projection attitude adjustment command is issued in the projection attitude adjustment thread, the first reference line extending along the outer shape of the image formation area 321a of the liquid crystal panel 321 is drawn on the image formation area 321a (step S6), and the first reference line is displayed as the first projection attitude adjustment image (frame image) on the display surface by using the image projection unit 300 (step S7). The description of the process in step S7 in FIG. 4 is simplified down to a description of "display first projection attitude adjustment image (frame image) on display surface."

It is then determined whether or not a reference image display command for displaying the second projection attitude adjustment image (reference image) has been issued from the remote control (step S8). When the reference image display command has been issued ("YES" in step S8), the angle of rotation of the projector enclosure 200 around the central axis is acquired from the inclination detection section 500 (step S9), the second reference line passing through the center of the image formation area 321a and inclined in accordance with the acquired angle of rotation is drawn on the image formation area 321a (step S10), and the second reference line is displayed as the second projection attitude adjustment image (reference image) on the display surface by using the image projection unit 300 (step S11). It is noted that the description of the process in step S11 is simplified down to a description of "display second projection attitude adjustment image (reference image) on display surface."

Assuming that the angle of rotation of the projector enclosure 200 around the central axis is, for example, 15 degrees counterclockwise with respect to the horizontal direction, the process in step S10, that is, the process of drawing the second reference line on the image formation area 321a is a process of drawing a straight line passing through the center of the image formation area 321a and inclined by 15 degrees clockwise with respect to a straight line that should be displayed horizontally on the image formation area 321a. That is, the process in step S10 is a process of drawing a straight line passing through the center of the image formation area 321a and inclined by the angle of rotation detected by the inclination detection section 500 in the direction opposite to the direction of the rotation.

Further, the processes in steps S9 to S11 remain being carried out until a reference image delete command is issued from the remote control.

That is, it is determined whether or not the reference image delete command has been issued (step S12). When no reference image delete command has been issued ("NO" in step S12), the processes in steps S9 to S11 remain being carried out. In this case, the frame image and the reference image remain displayed on the display surface. The user adjusts the projection attitude of the projector PJ1 based on the displayed frame image and reference image. How to perform the projection attitude adjustment will be described later.

On the other hand, when the reference image delete command has been issued in step S12 ("YES" in step S12), the control proceeds to step S8. In step S8, when it is determined that the issued command is not the reference image display command, adjustment based on a control command for performing other types of adjustment (keystone correction, for example) is performed (step S13). It is then determined whether or not an other adjustment termination command has been issued. When the other adjustment termination command has been issued ("YES" in step S14), the control proceeds to step S5, whereas when no other adjustment termination command has been issued ("NO" in step S14), the control proceeds to step S8.

Figure 5:
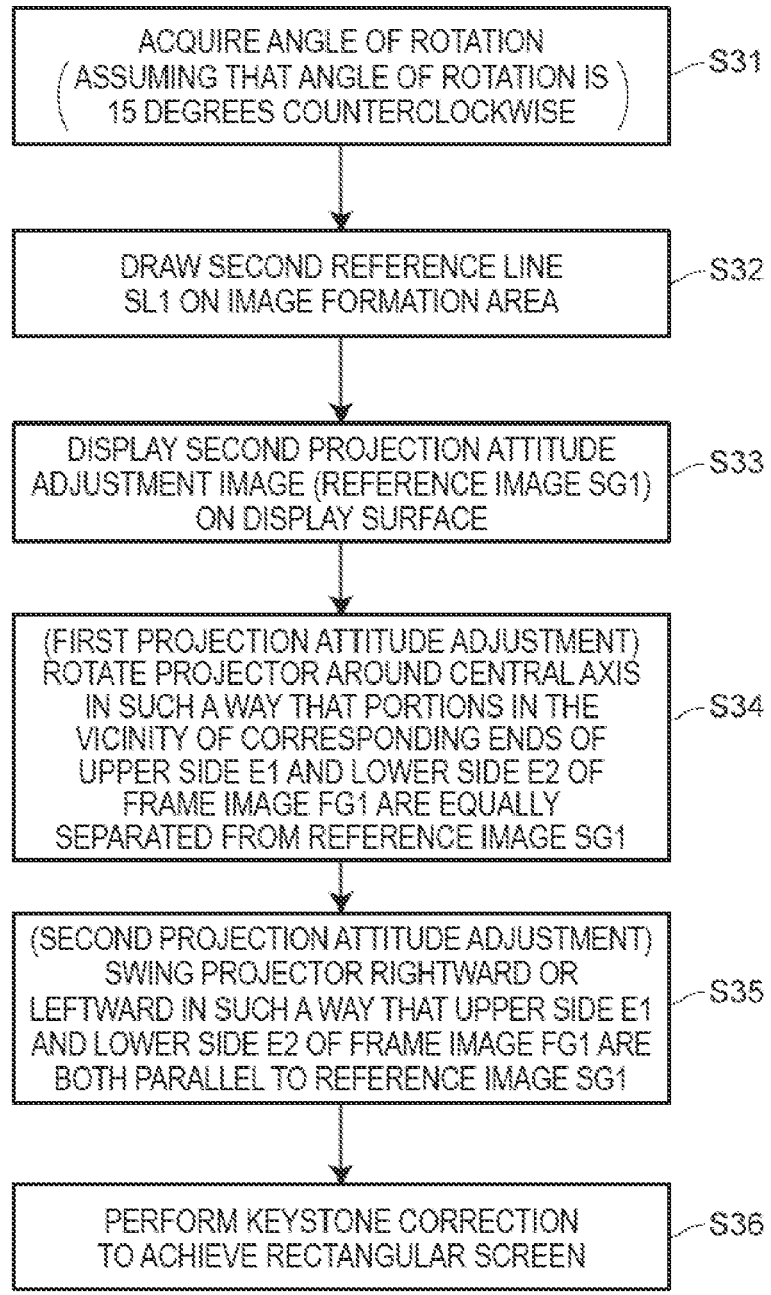
FIG. 5 is a descriptive diagram of adjustment of the projection attitude of the projector according to the first embodiment.

FIG. 5 and FIGS. 6A to 6F are descriptive diagrams of the adjustment of the projection attitude of the projector according to the first embodiment. FIG. 5 is a descriptive diagram of steps of the projection attitude adjustment, and steps S31 to S33 in FIG. 5 are processes corresponding to steps S9 to S11 in FIG. 4. Further, steps S34 and S35 in FIG. 5 are the projection attitude adjustment performed by the user (first projection attitude adjustment and second projection attitude adjustment), and step S36 in FIG. 5 is a process corresponding to step S13 in FIG. 4.

Figure 6A:
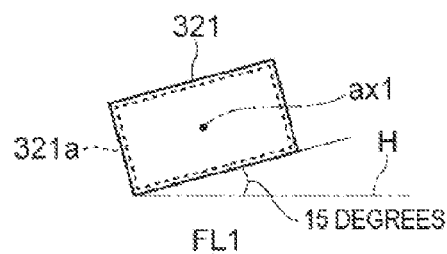
FIGS. 6A to 6F are descriptive diagrams of the adjustment of the projection attitude of the projector according to the first embodiment.
Figure 6B:

FIGS. 6A to 6F specifically show steps S31 to S36 in FIG. 5. FIGS. 6A and 6B show the liquid crystal panel 321, and FIGS. 6C to 6F show the first projection attitude adjustment image (frame image) and the second projection attitude adjustment image (reference image) displayed on the display surface (display surface 950 in FIG. 2, for example).

The adjustment of the projection attitude of the projector PJ1 according to the first embodiment will be described with reference to FIG. 5 and FIGS. 6A to 6F. In FIG. 5, which describes the processes in step S9 and the following steps in FIG. 4, the description will be made assuming that the first projection attitude adjustment image (frame image) has been already displayed on the display surface.

In this state, the image display control section 400 acquires the angle of rotation outputted from the inclination detection section 500 (step S31 in FIG. 5). In this example, it is assumed that the projector enclosure 200 at this point has been rotated by 15 degrees counterclockwise around the central axis with respect to a horizontal line. The state in which the projector enclosure 200 has been rotated by 15 degrees counterclockwise around the central axis means that the liquid crystal panel 321 has been rotated by 15 degrees counterclockwise around the central axis or the center of the image formation area 321a (central axis ax1) serving as the axis of rotation, as shown in FIG. 6A.

FIG. 6A shows the liquid crystal panel 321 viewed from the rear end 200a of the projector PJ1 (see FIGS. 1A and 1B). Further, in FIG. 6A, the broken-line frame drawn in the liquid crystal panel 321 represents the outer shape of the image formation area 321a of the liquid crystal panel 321.

The image display control section 400 of the projector PJ1 draws a second reference line SL1 (see FIG. 6B) according to the angle of rotation acquired at the time of drawing on the image formation area 321a of the liquid crystal panel 321 (step S32 in FIG. 5). At this point, a first reference line FL1 (see FIG. 6B) extending along the outer shape of the image formation area 321a has been already drawn on the image formation area 321a.

FIG. 6B specifically shows step S32 in FIG. 5. As shown in FIG. 6B, the first reference line FL1 extending along the outer shape of the image formation area 321a has been already drawn on the image formation area 321a, and in this state, the second reference line SL1 is drawn on the image formation area 321a. It is noted that the first reference line FL1 only needs to be a line extending along or parallel to the outer shape of the image formation area 321a of the liquid crystal panel 321 (see FIG. 6A) and does not necessarily coincide with the outer shape of the image formation area 321a. It is, however, assumed in the projector PJ1 according to the first embodiment that the first reference line FL1 coincides with the four sides of the outer shape of the image formation area 321a of the liquid crystal panel 321.

On the other hand, the second reference line SL1 is a straight line passing through the center of the image formation area 321a (central axis ax1), as shown in FIG. 6B. Further, since the angle of rotation acquired at the time of drawing of the second reference line is "15 degrees counterclockwise around the central axis of the projector PJ1 with respect to a horizontal line I-I," the second reference line SL1 drawn on the image formation area 321a is inclined to the image formation area 321a by 15 degrees clockwise around the central axis of the projector PJ1.

The second reference line SL1 is then displayed as a second projection attitude adjustment image (reference image) SG1 on the display surface by using the image projection unit 300 (step S33 in FIG. 5).

Figure 6C:
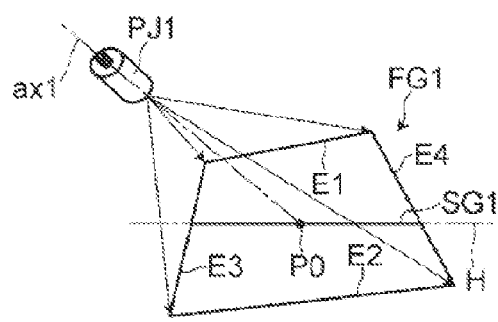

FIG. 6C specifically shows step S33 in FIG. 5. In this stage, a first projection attitude adjustment image (frame image) FG1 corresponding to the first reference line FL1 extending along the outer shape of the image formation area 321a of the liquid crystal panel 321 and the second projection attitude adjustment image (reference image) SG1 corresponding to the second reference line SL1 are displayed on the display surface, as shown in FIG. 6C. In the following description, the first projection attitude adjustment image (frame image) FG1 is abbreviated to a "frame image FG1," and the second projection attitude adjustment image (reference image) SG1 is abbreviated to a "reference image SG1" in some cases.

It is assumed in this case that the projector PJ1 is so installed that it performs projection from an obliquely upward, leftward position toward an obliquely downward, rightward position with respect to the display surface. As a result, the frame image FG1 is displayed on the display surface in the form of a distorted quadrangle (see FIG. 6C). On the other hand, the reference image SG1, which is drawn on the image formation area 321a in consideration of the angle of rotation of the projector enclosure 200 around the central axis, is displayed in the form of a line extending along the horizontal line H on the display surface (see FIG. 6C). "P0" shown in FIG. 6C is a position corresponding to the center of the image formation area 321a (central axis ax1).

From this state, the user performs the first projection attitude adjustment (step S34 in FIG. 5). The first projection attitude adjustment is an operation of rotating the projector enclosure 200 around the central axis. The user performs the first projection attitude adjustment while looking at the frame image FG1 and the reference image SG1 displayed on the display surface. It is noted that even when the projector enclosure 200 is rotated around the central axis, the reference image SG1 remains displayed as the horizontal line on the display surface.

That is, the image display control section 400 acquires the angle of rotation of the projector enclosure 200 that the inclination detection section 500 keeps outputting and draws based on the acquired angle of rotation the second reference line SL1 according to the angle of rotation on the image formation area 321a. Therefore, when the projector enclosure 200 is rotated around the central axis, the reference image SG1 remains displayed on the display surface always as the horizontal line irrespective of the rotation of the projector enclosure 200. On the other hand, the displayed frame image FG1 is inclined in accordance with the inclination of the projector enclosure 200.

In the first projection attitude adjustment, the projector enclosure 200 is so rotated around the central axis that among the four sides (upper side E1, lower side E2, left side E3, and right side E4) of the distorted quadrangular frame image FG1 (see FIG. 6C), portions in the vicinity of corresponding ends of the upper side E1 and the lower side E2 are equally separated from the reference image SG1.

Figure 6D:
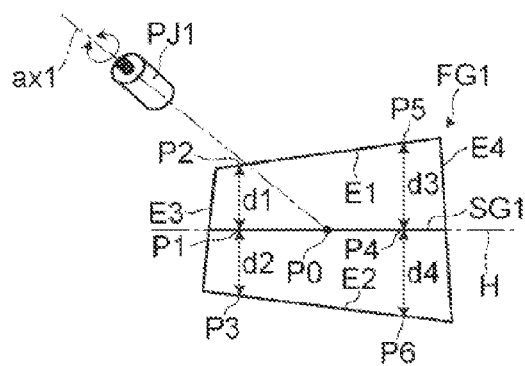

FIG. 6D specifically shows step S34 in FIG. 5. As shown in FIG. 6D, the projector enclosure 200 is so rotated around the central axis not only that a distance d1 between a predetermined position P1 in the vicinity of the left end of the reference image SG1 and a predetermined position P2 in the vicinity of the left end of the upper side E1 and on a line perpendicular to the reference image SG1 and passing through the predetermined position P1 is equal to a distance d2 between the predetermined position P1 in the reference image SG1 and a predetermined position P3 in the vicinity of the left end of the lower side E2 and on a line perpendicular to the reference image SG1 and passing through the predetermined position P1 but also that a distance d3 between a predetermined position P4 in the vicinity of the right end of the reference image SG1 and a predetermined position P5 in the vicinity of the right end of the upper side E1 and on a line perpendicular to the reference image SG1 and passing through the predetermined position P4 is equal to a distance d4 between the predetermined position P4 in the reference image SG1 and a predetermined position P6 in the vicinity of the right end of the lower side E2 and on a line perpendicular to the reference image SG1 and passing through the predetermined position P4.

When the distance d1 and the distance d2 become equal to each other and the distance d3 and the distance d4 become equal to each other, the first projection attitude adjustment is completed, and the second projection attitude adjustment is subsequently performed (step S35 in FIG. 5). The second projection attitude adjustment is an operation of swinging the projector PJ1 rightward or leftward with respect to the display surface in such a way that the upper side E1 and the lower side E2 both become parallel to the reference image SG1.

Figure 6E:
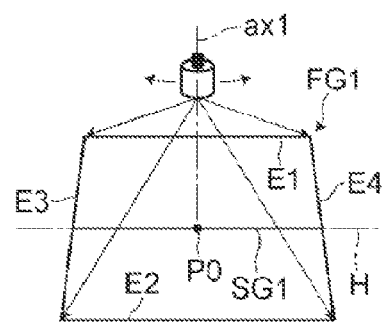

FIG. 6E specifically shows step S35 in FIG. 5. As shown in FIG. 6E, the projector PJ1 is so swung rightward or leftward that the upper side E1 and the lower side E2 of the frame image FG1 both become parallel to the reference image SG1.

The swinging operation described above allows the upper side E1 and the lower side E2 of the frame image FG1 to both become parallel to the reference image SG1. At this point, since the projector PJ1 has an attitude that causes it to perform projection obliquely downward, a projected image has a trapezoidal shape having the upper side E1 shorter than the lower side E2 (isosceles trapezoid in this case), as shown in FIG. 6E.

Figure 6F:
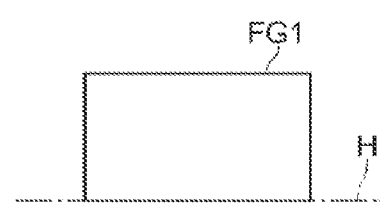

After the frame image FG1 has a trapezoidal shape, such as that shown in FIG. 6E, the projector PJ1 uses its correction function (keystone correction function in this case) to perform trapezoidal correction (step S36 in FIG. 5). The frame image FG1 thus becomes rectangular on the display surface (see FIG. 6F). It is noted that FIG. 6F shows a state in which the reference image SG1 has been deleted. The reference image SG1 is deleted by issuance of the reference image delete command (see step S12 in flowchart in FIG. 4).

The first projection attitude adjustment and the second projection attitude adjustment in the projector PJ1 according to the first embodiment are performed by the user who manually operates the projector PJ1 while looking at the frame image FG1 and the reference image SG1. The first projection attitude adjustment and the second projection attitude adjustment are therefore not projection attitude adjustment in an exact sense but are approximate projection attitude adjustment by which a frame image displayed on the display surface has a shape that is visually acceptable.

Specifically, in the first projection attitude adjustment, the user rotates the projector enclosure 200 around the central axis while looking at the frame image and the reference image displayed on the display surface in such a way that d1 and d2 are visually equal to each other and so are d3 and d4. When d1 and d2 become visually equal to each other and so do d3 and d4, the second projection attitude adjustment is performed. That is, in the second projection attitude adjustment, the user swings the projector PJ1 rightward or leftward in such a way that the upper side E1 and the lower side E2 are both visually parallel to the reference image SG1.

As described above, the projector according to the first embodiment, when the projection attitude of the projector PJ1 is adjusted, displays the frame image FG1 and the reference image SG1, such as those shown in FIG. 6C, on the display surface, and the user can perform the first projection attitude adjustment and the second projection attitude adjustment based on the frame image FG1 and the reference image SG1 displayed on the display surface. When the first projection attitude adjustment and the second projection attitude adjustment are completed, the projector PJ1 uses its original correction function (such as keystone correction) to form an image that is not inclined to the horizontal line H and is rectangular, as shown in FIG. 6F.

As described above, even when the projector PJ1 is a light-bulb-type projector, such as that shown in FIG. 1A, the projection attitude of the projector can be readily adjusted, whereby the light-bulb-type projector can display a content image on the display surface that is comfortably viewed by a viewer without causing the viewer to feel something is wrong with the image.

Second Embodiment

Figure 7:
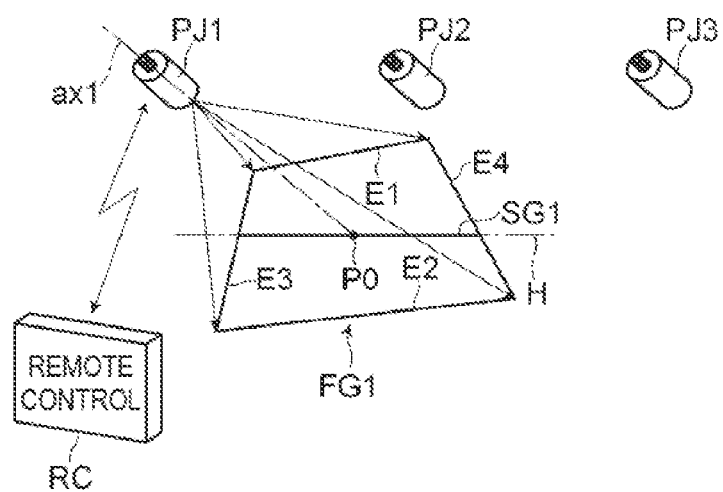
FIG. 7 is a descriptive diagram of adjustment of the projection attitude of a projector according to a second embodiment.

FIG. 7 is a descriptive diagram of adjustment of the projection attitude of a projector according to a second embodiment. The adjustment of the projection attitude of a projector according to the second embodiment is used in a case where not only an image projected by the projector PJ1 used in the first embodiment but also images projected by projectors PJ2 and PJ3 are displayed side by side on a display surface (display surface 950 in FIG. 2, for example).

It is assumed that the projection attitude of each of the projectors PJ1, PJ2, and PJ3 can be independently adjusted by performing the projection attitude adjustment described in the first embodiment (see FIG. 5 and FIGS. 6A to 6F). In FIG. 7, the same portions as those in FIG. 6C have the same reference characters.

It is further assumed that the projector PJ1, the projector PJ2, and the projector PJ3 are arranged in this order from the left, as shown in FIG. 7. Although not shown, an image projected by the projector PJ1, an image projected by the projector PJ2, and an image projected by the projector PJ3 are therefore laterally arranged side by side and displayed on the display surface. The thus arranged three projectors PJ1, PJ2, and PJ3 can be remotely operated with a single remote control RC.

Further, all the projectors PJ1, PJ2, and PJ3 can be configured and operated in the same manner (see FIGS. 1A and 1B, 3, and 4). In the second embodiment, however, in which the single remote control RC remotely operates the three projectors PJ1, PJ2, and PJ3, each of the projectors is provided with an ID (identification) as identification information specific to the projector, and the ID is stored in the storage device in the image display control section 400. When the remote control RC inputs an ID, the remote control RC is connected to the projector associated with the ID. The control described above is performed by the image display control section 400 provided in each of the projectors PJ1, PJ2, and PJ3.

Further, the image display control section 400 provided in each of the projectors PJ1, PJ2, and PJ3 has a function of displaying the frame image FG1, which is the first projection attitude adjustment image, on the display surface by using the image projection unit 300 when the remote control RC inputs the ID associated with the projector. In this case, displaying the frame image FG1 serves as information for notifying that the remote control RC has been connected to the projector.

For example, when the remote control RC inputs the ID associated with the projector PJ1, the remote control RC is connected to the projector PJ1, and the image display control section 400 in the projector PJ1 draws the first reference line FL1 on the image formation area 321a of the liquid crystal panel 321 to display the frame image FG1 on the display surface by using the image projection unit 300 as information for notifying that the remote control RC has been connected to the projector PJ1. At this point, it is preferable that the frame image FG1 projected by the projector PJ1 blinks on the display surface. The adjustment of the projection attitude of the projector PJ1 will not be described because the projection attitude adjustment can be performed by following the procedure shown in FIG. 5 and FIGS. 6A to 6F.

The configuration described above allows the user to readily relate a projector the projection attitude of which is currently about to be adjusted to an image projected by the projector. In particular, causing the frame image FG1 to blink on the display surface allows the user to intuitively relate a projector the projection attitude of which is currently about to be adjusted to an image projected by the projector.

When the adjustment of the projection attitude of the projector PJ1 is completed, and the remote control RC subsequently inputs the ID associated with the projector PJ2, the image display control section 400 in the projector PJ2 displays the frame image FG1 on the display surface by using the image projection unit 300 as information for notifying that the remote control RC has been connected to the projector PJ2. In this case as well, it is preferable that the frame image FG1 projected by the projector PJ2 blinks on the display surface.

When the adjustment of the projection attitude of the projector PJ2 is completed, the remote control RC subsequently inputs the ID associated with the projector PJ3. In this case as well, the projector PJ3 operates in the same manner as the projectors PJ1 and PJ2.

As described above, in the projector according to the second embodiment, the image display control section 400 provided in each of the projectors PJ1, PJ2, and PJ3 has a function of displaying the frame image FG1 on the display surface by using the image projection unit 300 when the remote control RC inputs the ID associated with the projector, and the displaying of the frame image FG1 serves as information for notifying that and the remote control RC has been connected to the projector.

In each of the projectors PJ1, PJ2, and PJ3, since the image display control section 400 in the projector has the function described above, the user who uses the single remote control RC to remotely operate the plurality of projectors can readily identify a projector the projection attitude of which is currently about to be adjusted among the plurality of projectors. Therefore, even when images projected by the plurality of projectors are displayed side by side on the display surface, the projection attitude of each of the projectors can be readily and reliably adjusted with the single remote control RC.

FIG. 7 shows the case where the projection attitude adjustment is performed sequentially from the left in the order of the projector PJ1, the projector PJ2, and the projector PJ3 by way of example, but the projection attitude adjustment is not necessarily performed in this order. The projection attitude adjustment may alternatively be performed in the order of the projector PJ3, the projector PJ2, and the projector PJ1 from the right, or the projection attitude adjustment may be first made on the projector PJ2, which is located in the middle, and then on the projector PJ1 followed by the projector PJ3 or on the projector PJ3 followed by projector PJ1.

Further, when a plurality of projectors are present as shown in FIG. 7 (three projectors in the case shown in FIG. 7), the frame images FG1 and the reference images SG1 projected by the projectors can be displayed in different colors. A projector the projection attitude of which is about to be adjusted can thus be readily and reliably related to the frame image FG1 and the reference image SG1 displayed on the display surface.

Moreover, FIG. 7 shows the case where the three projectors are remotely controlled with the single remote control RC by way of example, but the number of projectors is not limited to three. The number of projectors may be two or four or more.

Third Embodiment

In a third embodiment, a description will be made of a projector that performs projection attitude adjustment by forming a third reference line and a fourth reference line parallel to each other on the image formation area 321a of the light modulator 321.

FIGS. 8A to 8E are descriptive diagrams of adjustment of the projection attitude of a projector PJ4 according to the third embodiment.

It is assumed that the configuration of the projector PJ4 is the same as those of the projectors PJ1, PJ2, and PJ3 according to the first and second embodiments. The same portions therefore have the same reference characters.

Figure 8A:
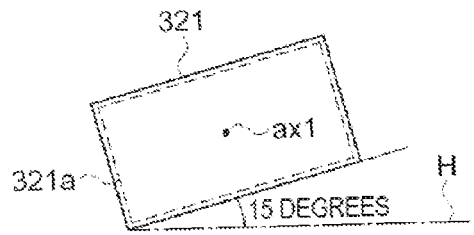
FIGS. 8A to 8E are descriptive diagrams of adjustment of the projection attitude of a projector according to a third embodiment.
Figure 8B:
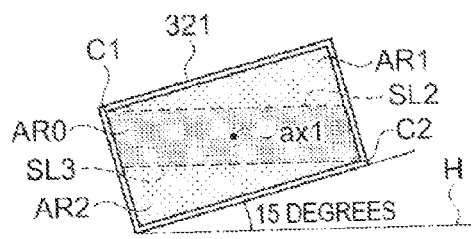
Figure 8C:
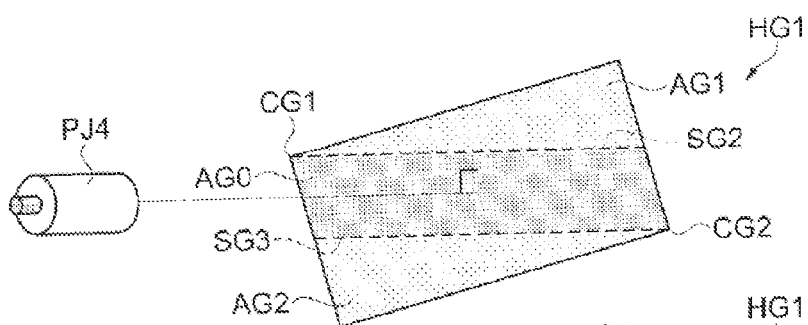
Figure 8D:
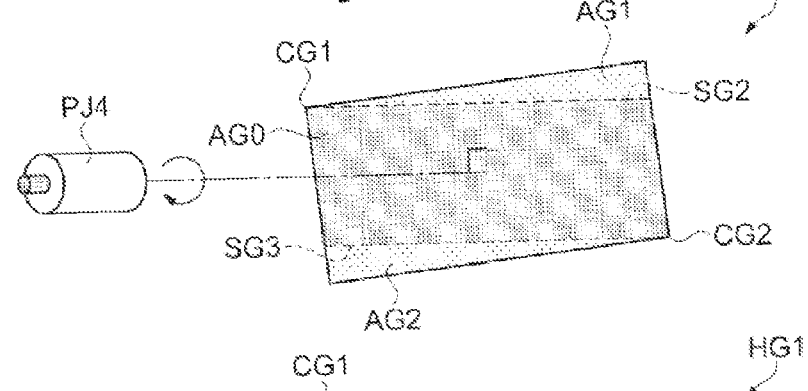
Figure 8E:
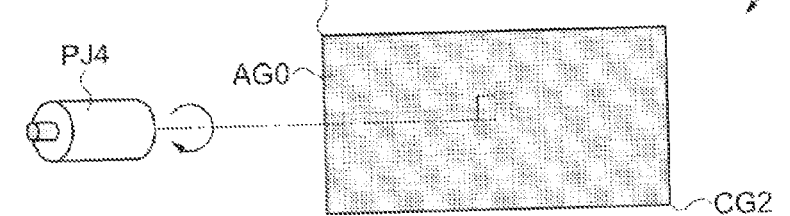
Figure 9:
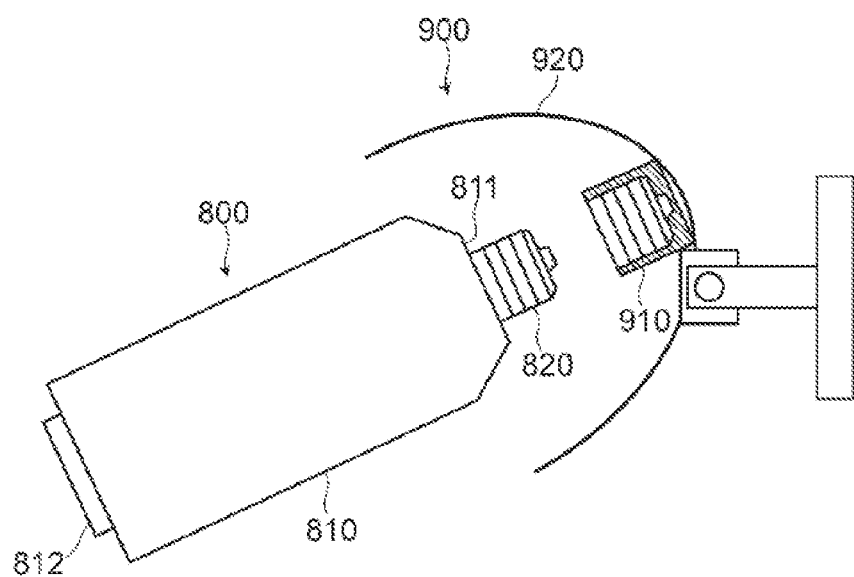
FIG. 9 is a descriptive view of the projector described in JP-A-2005-99588.

FIGS. 8A and 8B show the liquid crystal panel 321, and FIGS. 8C to 8E show a third projection attitude adjustment image displayed on a display surface (display surface 950 in FIG. 2, for example). In the third embodiment, the description will be made of a case where the projector PJ4 is perpendicular to the display surface 950. That is, the central axis ax1 of the projector PJ4 is perpendicular to the display surface 950.

In FIG. 8A, the image display control section 400 acquires the angle of rotation outputted from the inclination detection section 500. It is assumed that the projector enclosure 200 at this point has been rotated by 15 degrees counterclockwise around the central axis with respect to a horizontal line. The state in which the projector enclosure 200 has been rotated by 15 degrees counterclockwise around the central axis means that the liquid crystal panel 321 has been rotated by 15 degrees counterclockwise around the central axis or the center of the image formation area 321a (central axis ax1 serving as the axis of rotation.

FIG. 8A shows the liquid crystal panel 321 viewed from the rear end 200a (see FIGS. 1A and 1B) of the projector PJ4. Further, in FIG. 8A, the broken-line frame drawn in the liquid crystal panel 321 represents the outer shape of the image formation area 321a of the liquid crystal panel 321.

Upon receiving the projection attitude adjustment command or any other instruction, the projector PJ4 enters a projection attitude adjustment mode according to the third embodiment. In the projection attitude adjustment mode according to the present embodiment, the image display control section 400 in the projector PJ4 keeps acquiring the angle of rotation from the inclination detection section 500 and forming a third reference line SL2 and a fourth reference line SL3 (see FIG. 8B) according to the acquired angle of rotation on the image formation area 321a of the liquid crystal panel 321. The third reference line SL2 and the fourth reference line SL3 will be described below. The third reference line SL2 and the fourth reference line SL3 are so formed on the image formation area 321a that they are parallel to the horizontal line H. Further, the third reference line SL2 is a straight line passing through a first corner C1 of the image formation area 321a, and the fourth reference line SL3 is a straight line passing through a second corner C2 of the image formation area 321a, which is diagonally opposite to the first corner C1.

The image display control section 400 then differently displays an inner area AR0, which is surrounded by the third reference line SL2 and the fourth reference line SL3, and outer areas AR1 and AR2, which are areas outside the third and fourth reference lines, in the image formation area 321a. For example, the inner area AR0 may be displayed in red, whereas the outer areas AR1 and AR2 may be displayed in blue. Further, a content image may be displayed in the inner area AR0, or a symbol, a figure, and any other object other than a content image may be displayed in the inner area AR0. In this case, the third reference line SL2 and the fourth reference line SL3 only need to indicate the boundaries between the inner area AR0 and the outer areas AR1, AR2 in the image formation area 321a, and each of the lines is not necessarily displayed in the form of a solid line or a broken line.

FIG. 8C shows a third projection attitude adjustment image HG1 displayed on the display surface 950 by using the image projection unit 300. On the display surface 950 are displayed (projected) an outer display area AG1 surrounded by a line corresponding to the outer shape of the image formation area 321a of the liquid crystal panel 321 and a line SG2 corresponding to the third reference line SL2 (that is, area corresponding to outer area AR1) and an outer display area AG2 surrounded by the line corresponding to the outer shape of the image formation area 321a and a line SG3 corresponding to the fourth reference line SL3 (that is, area corresponding to outer area AR2). Further, an inner display area AG0 surrounded by the line corresponding to the outer shape of the image formation area 321a, the line SG2 corresponding to the third reference line SL2, and the line SG3 corresponding to the fourth reference line SL3 (that is, area corresponding to inner area AR0) is displayed on the display surface 950. In the present embodiment, since the central axis ax1 of the projector PJ4 is perpendicular to the display surface 950, the line SG2 and the line SG3 are parallel to the horizontal line H, but when the central axis ax1 of the projector PJ4 is not perpendicular to the display surface 950, the line SG2 or the line SG3 is not necessarily parallel to the horizontal line H.

From the state shown in FIG. 8C, the user performs projection attitude adjustment. The projection attitude adjustment in the present embodiment is an operation of rotating the projector enclosure 200 around the central axis. The user performs the projection attitude adjustment while looking at the outer display area AG1 and the outer display area AG2 of the third projection attitude adjustment image HG1 displayed on the display surface 950.

That is, the image display control section 400 keeps acquiring the angle of rotation of the projector enclosure 200 outputted from the inclination detection section 500 and drawing based on the acquired angle of rotation the third reference line SL2 and the fourth reference line SL3 according to the angle of rotation on the image formation area 321a. Therefore, when the projector enclosure 200 is rotated around the central axis, the outer display area AG1 and the outer display area AG2 shrink or enlarge on the display surface 950. The user then rotates the projector enclosure 200 in a direction in which the outer display area AG1 and the outer display area AG2 shrink.

FIG. 8D shows the outer display area AG1 and the outer display area AG2 having been shrunk by the operation described above. The user further rotates the projector enclosure 200 around the central axis in the direction in which the outer display area AG1 and the outer display area AG2 shrink, and when the outer display area AG1 and the outer display area AG2 vanish as shown in FIG. 8E, the projection attitude adjustment is completed. Upon receiving a projection attitude adjustment termination command or any other instruction, the projector PJ4 terminates the projection attitude adjustment mode and, for example, displays a content image.

The present embodiment has been described with reference to the case where the central axis ax1 of the projector PJ4 is perpendicular to the display surface 950. When the central axis ax1 is not perpendicular to the display surface 950, the projector PJ4 can be swung rightward or leftward (see first embodiment) and the keystone correction function can be used to perform trapezoidal correction (see first embodiment) after the projection attitude adjustment described above is completed to display (project) an image that is rectangular and is not inclined to the horizontal line H.

As described above, in the projector PJ4 according to the third embodiment, the image display control section 400 forms the third reference line SL2 and the fourth reference line SL3 parallel to the horizontal line H on the image formation area 321a irrespective of the inclination of the projector enclosure 200. The user can then adjust the projection attitude based on the two reference lines. The convenience of the user who adjusts the projection attitude of the projector PJ4 is thus improved.

Specifically, in the projection attitude adjustment mode in the present embodiment, the third projection attitude adjustment image HG1 has the outer display areas AG1 and AG2 displayed outside the lines SG2 and SG3 respectively and the inner display area AR0 displayed inside the lines SG2 and SG3. The user rotates the projector enclosure 200 around the central axis in such a way that the outer display areas AG1 and AG2 shrink (decrease in size). The projector PJ4 can thus be readily (efficiently) so adjusted that it is not inclined to the horizontal line H.

In the present embodiment, as the two reference lines, the reference line SL2 passing through the first corner C1 of the image formation area 321a and the reference line SL3 passing through the second corner C2 diagonally opposite to the first corner C1 are formed. The reference lines allow the user to readily adjust the projection attitude because when the projector is adjusted into a position where an optimum projection attitude is achieved, the outer display area AG1 and the outer display area AG2 vanish.

The invention is not limited to the embodiments described above and can be implemented in a variety of variations to the extent that they do not depart from the scope of the invention as defined by the claims. For example, the following variations are conceivable.

(1) In the first and second embodiments described above, the reference image is a horizontal line on the display surface (display surface 950 in FIG. 2, for example). The reference image may instead be a line extending in the vertical direction (vertical line) on the display surface. In this case, the first projection attitude adjustment is so performed that the left side E3 and the right side E4 of the frame image FG1 become parallel to the vertical line.

(2) In the first and second embodiments described above, the frame image FG1 is displayed in the form of a quadrangle having four sides. When the reference image is a horizontal line, only the two sides of the upper side E1 and the lower side E2 of the quadrangle may be displayed, whereas when the reference image is a vertical line, only the left side E3 and the right side E4 of the quadrangle may be displayed. Further, each of the frame image FG1 and the reference image SG1 to be displayed is not necessarily drawn with a solid line but may be displayed, for example, by using a broken line or a dashed line.

(3) In the first and second embodiments described above, when the user performs the first projection attitude adjustment and the second projection attitude adjustment, the user visually determines the degree of the adjustment. The degree of the adjustment may alternatively be determined by the projector (projector PJ1, for example) and may be displayed in a conceivable way. For example, the projector PJ1 may be provided with a camera, which may capture an image displayed on the display surface. The resultant captured image data may then be supplied to the image display control section 400, which may determine the degree of the adjustment based on the captured image data and display the state of the adjustment on the display surface.

Specifically, for example, when the first projection attitude adjustment is performed appropriately (when the state shown in FIG. 6D is achieved), the frame image FG1 is caused to blink or the color of the frame image FG1 is changed. Similarly, when the second projection attitude adjustment is performed appropriately (when the state shown in FIG. 6E is achieved), the frame image FG1 is caused to blink or the color of the frame image is changed. Whether or not the first projection attitude adjustment has been performed appropriately and whether or not the second projection attitude adjustment has been performed appropriately can be determined by the image display control section 400 based on the captured image data.

The user who performs the projection attitude adjustment can thus readily determine whether or not the first and second projection attitude adjustments have been performed appropriately, whereby the projection attitude adjustment can be efficiently performed.

(4) In the projector according to each of the embodiments, a single-panel projector including one liquid crystal panel 321 is presented by way of example, but a three-panel projector including light modulators corresponding to RGB may instead be used.

(5) The projector according to each of the above embodiments has been described with reference to the configuration including the light source section 310, which outputs red light, green light, and blue light in a time division manner, and the image formation section 320, which sequentially modulates the color light fluxes. The projector may instead include a light source section 310 that outputs light containing red light, green light, and blue light (white light, for example) and an image formation section 320 that has a function of separating the light into the color light fluxes by using a color filter.

(6) In the projector according to each of the embodiments described above, the projection lens 330 is not limited to a specific lens and may, for example, be a lens that has electrodes (not shown) and expands or contracts (has changeable thickness) in accordance with the magnitude of a voltage applied to the electrodes for adjustment of the focal length (referred to as focus adjustment). Such a lens has been known, and there is a lens having a thickness that changes, for example, from 750 to 375 micrometers when a voltage of 20 volts is applied to the electrodes.

(7) In the projector according to each of the embodiments described above, the aspect in which the optical axis of the projection lens 330 coincides with the central axis ax1 of the projector PJ1 is presented, but the axes do not necessarily coincide with each other, and the optical axis of the projection lens 330 only needs to extend along (for example, only needs to be parallel to) the central axis ax1 of the projector PJ1. Further, in the projector according to the first embodiment, the light modulator described above is so disposed that the optical axis of the projection system passes through the center of the image formation area, but the light modulator is not necessarily disposed this way.

(8) In the projector according to the first embodiment, the second reference line SL1 is a single straight line passing through the center of the image formation area 321a but is not limited thereto. For example, the second reference line SL1 may be formed of two straight lines that intersect each other at the center of the image formation area 321a. Further, for example, the second reference line SL1 may be formed of two straight lines parallel to each other and so drawn that they sandwich the center of the image formation area 321a.

(9) In the projector according to the first embodiment, the image display control section 400 draws the first reference line extending along the outer shape of the image formation area 321a on the image formation area 321a. The action of the image display control section 400 described above can be replaced with an action of filling the inside (at least the portion in the vicinity of the outer shape) of the image formation area 321a with a predetermined color to clarify the boundary between the inside and outside of the image formation area 321a. In this case, the boundary between the inside and outside of the image formation area 321a functions as the first reference line.

(10) In the projector according to the third embodiment, the third reference line SL2 is a straight line passing through the first corner C1 of the image formation area 321a, and the fourth reference line SL3 is a straight line passing through the second corner C2 of the image formation area 321a, which is diagonally opposite to the first corner C1. The third reference line is, however, not limited to a straight line passing through the first corner C1 of the image formation area 321a. The third reference line may pass through a predetermined first point in the image formation area 321a, and the fourth reference line may pass through a second point so disposed that the first and second points are symmetrical with respect to the center of the image formation area 321a. In this case, the user can adjust the projection attitude by rotating the projector enclosure 200 around the central axis in such a way that the outer display area AG1 and the outer display area AG2 are minimized.

(11) In the third embodiment described above, the third reference line SL2 and the fourth reference line SL3 are so formed on the image formation area 321a that they are parallel to the horizontal line H. Each of the third reference line SL2 and the fourth reference line SL3 may alternatively be a line extending perpendicularly to the horizontal line H (vertical line) on the image formation area 321a. In this case, the outside areas are formed outside the image formation area 321a in the rightward and leftward directions. The user can then adjust the projection attitude by rotating the projector enclosure 200 around the central axis in such a way that the displayed outer display areas shrink.

(12) In each of the embodiments described above, the structure that allows the projector enclosure 200 to rotate around the central axis without rotation of the connection section 100 of the projector with the connection section 100 screwed into the light bulb attachment socket to the end thereof is provided in the projector. The structure is not necessarily provided in the projector but may be provided in the light bulb attachment socket.

(13) In the embodiments described above, the projectors PJ1, PJ2, PJ3, and PJ4 connectable to a light bulb fixture have been described. For example, the invention is also applicable to a typical projector or any other similar apparatus installed on a desktop for use.

(14) In the projector according to each of the embodiments described above, the case where a transmissive liquid crystal light modulator (liquid crystal panel) is used as the light modulator is presented by way of example, but the light modulator is not limited thereto. The light modulator may instead be a reflective liquid crystal light modulator or a digital micromirror device.

What is claimed is:

1. A projector comprising:
a light source;
a light modulator having an image formation area that is adapted to modulate light emitted from the light source to form an image;
a projection system that is adapted to project the image formed by the light modulator to display the image on a display surface;
an enclosure that holds at least the light modulator and the projection system;
an inclination detection section that is adapted to detect the inclination of the enclosure with respect to an axis along the optical axis of the projection system that serves as the axis of rotation; and
an image display control section that is adapted to form a reference line on the image formation area, the reference line having a predetermined angle with respect to a horizontal line irrespective of the inclination of the enclosure,
wherein the image display control section is adapted to
change the inclination of the reference line with respect to the image formation area in accordance with the inclination of the enclosure detected by the inclination detection section in such a way that the reference line has the predetermined angle with respect to the horizontal line, and
draw a first reference line on the image formation area to display the first reference line inclined on the display surface in accordance with the inclination of the enclosure and draw a second reference line as the reference line on the image formation area to display the second reference line uninclined or at a fixed inclination on the display surface irrespective of the inclination of the enclosure.

2. The projector according to claim 1,
wherein the image display control section is adapted to draw a line extending along the outer shape of the image formation area as the first reference line.

3. The projector according to claim 2,
wherein the image display control section is adapted to draw lines corresponding to at least two opposing sides of the four sides of the outer shape of the image formation area as the first reference line.

4. The projector according to claim 3,
wherein the image display control section is adapted to draw four lines corresponding to the four sides of the outer shape of the image formation area as the first reference line.

5. The projector according to claim 1,
wherein the image display control section is adapted to draw a straight line inclined in a direction opposite to the inclination of the enclosure by the same angle as the inclination of the enclosure as the second reference line based on the inclination of the enclosure detected by the inclination detection section in such a way that the second reference line displayed on the display surface is a horizontal line.

6. The projector according to claim 1,
wherein the image display control section is adapted to draw a straight line inclined in a direction opposite to the inclination of the enclosure by the same angle as the inclination of the enclosure as the second reference line based on the inclination of the enclosure detected by the inclination detection section in such a way that the second reference line displayed on the display surface is a vertical line.

7. The projector according to claim 1,
wherein the image display control section is adapted to draw the second reference line in such a way that the second reference line passes through the center of the image formation area.

8. The projector according to claim 1, further comprising:
a communication section that is adapted to receive a remote operation signal issued from a remote operation apparatus; and
a storage section that stores identification information specific to the projector,
wherein the image display control section is adapted to draw the first reference line when the identification information is inputted from the remote operation apparatus.

9. The projector according to claim 8,
wherein the image display control section is adapted to cause the first reference line to blink.

10. The projector according to claim 1,
wherein the light modulator is so disposed that the optical axis of the projection system passes through the center of the image formation area.

11. The projector according to claim 1,
further comprising a connection section to be connected to a screw-in light bulb fixture,
wherein the axis of rotation along which the connection section is screwed into the light bulb fixture coincides with the optical axis of the projection system.

12. A method for controlling a projector including a light source, a light modulator having an image formation area that modulates light emitted from the light source to form an image, a projection system that projects the image formed by the light modulator to display the image on a display surface, and an enclosure that holds at least the light modulator and the projection system, the method comprising:
detecting the inclination of the enclosure with respect to an axis along the optical axis of the projection system that serves as the axis of rotation; and
forming a reference line on the image formation area, the reference line having a predetermined angle with respect to a horizontal line irrespective of the inclination of the enclosure,
wherein in the forming of a reference line,
the inclination of the reference line with respect to the image formation area is changed in accordance with the inclination of the enclosure detected in the detecting of the inclination in such a way that the reference line has the predetermined angle with respect to the horizontal line, and
a first reference line is drawn on the image formation area to display the first reference line inclined on the display surface in accordance with the inclination of the enclosure and a second reference line is drawn as the reference line on the image formation area to display the second reference line uninclined or at a fixed inclination on the display surface irrespective of the inclination of the enclosure.

13. A projector comprising:
a light source;
a light modulator having an image formation area that is adapted to modulate light emitted from the light source to form an image;
a projection system that is adapted to project the image formed by the light modulator to display the image on a display surface;
an enclosure that holds at least the light modulator and the projection system;
an inclination detection section that is adapted to detect the inclination of the enclosure with respect to an axis along the optical axis of the projection system that serves as the axis of rotation; and
an image display control section that is adapted to form a reference line on the image formation area, the reference line having a predetermined angle with respect to a horizontal line irrespective of the inclination of the enclosure,
wherein the image display control section is adapted to
change the inclination of the reference line with respect to the image formation area in accordance with the inclination of the enclosure detected by the inclination detection section in such a way that the reference line has the predetermined angle with respect to the horizontal line, and
form two reference lines substantially parallel to each other as the reference line on the image formation area and differentiate a display state inside the two reference lines and a display state outside thereof from each other.

14. The projector according to claim 13,
wherein the image display control section is adapted to form, as the two reference lines, a reference line passing through a first point in the image formation area and a reference line passing through a second point so disposed that the first and second points are symmetrical with respect to the center of the image formation area.

15. The projector according to claim 13, wherein the image display control section is adapted to form, as the two reference lines, a reference line passing through a first corner of the image formation area and a reference line passing through a second corner diagonally opposite to the first corner.

* * * * *